Feb. 10, 1931.                W. G. ANDERSON                1,791,947
                                  CULTIVATOR
                              Filed Oct. 28, 1929
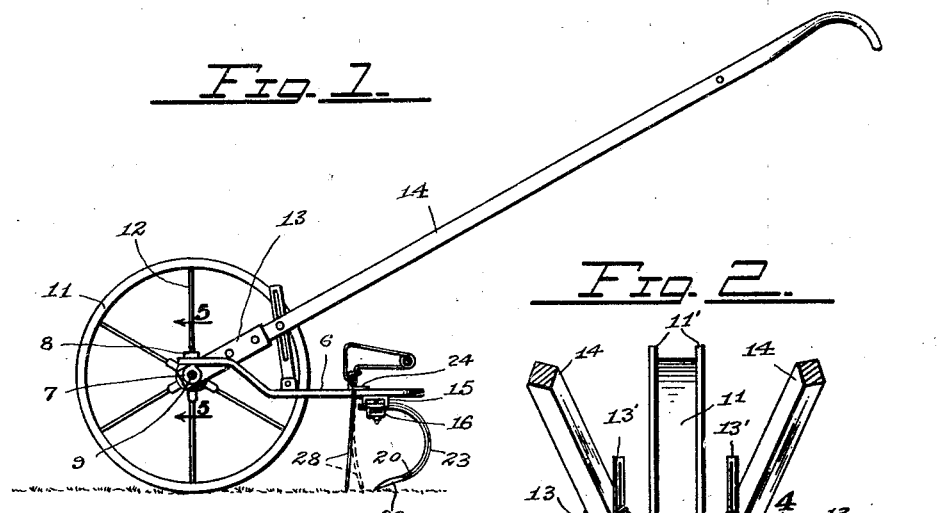
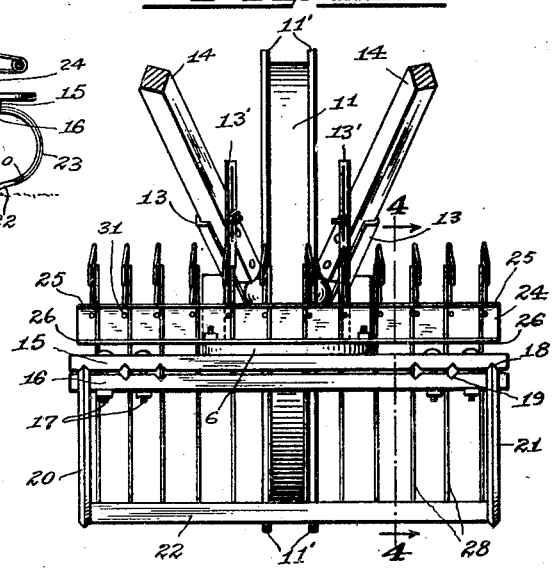
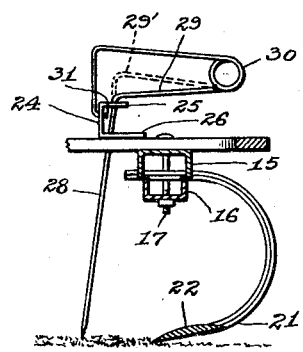
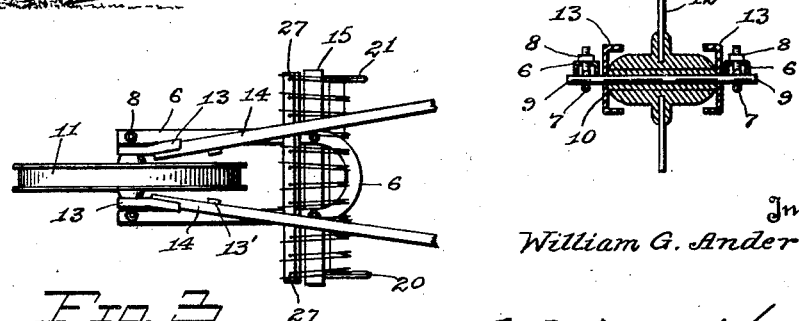
Inventor
William G. Anderson
By G. Ward Kemp
Attorney Patented Feb. 10, 1931

1,791,947

UNITED STATES PATENT OFFICE

WILLIAM G. ANDERSON, OF SEATTLE, WASHINGTON

CULTIVATOR

Application filed October 28, 1929. Serial No. 402,905.

This invention relates to cultivators, and particularly to improvements in cultivators made in combination with my hoe blade for cutting roots of weeds, for which Letters Patent of the United States were issued to me No. 1,374,051.

In the use of cultivators for small plants, it is important that weeds be killed while small and young, and that the cultivation of plants be such that the earth between the rows will be stirred and yet that no earth will be scattered or overturned upon the plants by the implements used;

And it is among the objects of this invention to provide an implement whereby the earth between the rows of plants will be thoroughly stirred without scattering any of the earth upon the plants on either side, and also that the roots of all weeds extending below a predetermined depth between the rows, shall be severed, and the upper roots exposed to the sun and the weeds killed.

A further object of the invention, is to provide a cultivating implement which may be easily and cheaply constructed, for the most part, from standard materials that may be readily purchased in the open markets, especially an adjustable frame and guide wheel from channel iron, and a plurality of adjustable spring teeth from standard wire of proper dimensions, with my cutting hoes of varying widths, and with means for adjusting the cutting depth of such hoe blades and the angle of the blade therefor.

With these and other objects as will further appear in the following specification, I have illustrated my invention by the accompanying drawing, of which—

Figure 1 is a side elevation of the implement,

Figure 2 is a rear elevation thereof, with parts broken away,

Figure 3 is a top plan, with parts broken away,

Figure 4 is a cross section view taken on line 4—4 of Figure 2, and

Figure 5 is a cross section of parts taken on line 5—5 of Figure 1.

Like numerals on the different figures represent like parts.

Numeral 6 represents the frame, made preferably from a flat bar with flanges for rigidity, commonly known as "channel iron", bent in substantially U form, with the two ends forward, and through which are adjusted suitable eye bolts 7 with nuts 8 for holding the ends rigidly of the axle rod 9 to the frame. On the axle is rotatably adjusted a tubular hub 10 for a guide wheel 11. The central or bearing part of the hub on the axle rod is preferably cut from a piece of ordinary pipe of suitable size, and the remainder of the hub cast of suitable material thereon for holding the spokes 12 of the wheel; and the wheel is preferably made from channel iron with the flanges 11' outward, to hold the wheel in line for guiding the implement in soft ground.

Cheek plates 13, 13, also preferably formed from channel iron with the flanges inward, are adjusted with one end thereof over the respective ends of the axle. The ends of the tube 10 abut against the inner walls of the cheek plates, whereby the hub is held in central position. The rear ends of the cheek plates extend back and are suitably bent on an outward angle and handles 14, 14 are attached thereto for operation, and adjusted by side slotted posts 13'.

Crosswise and beneath the frame near the rear end thereof is provided a holding bar preferably formed of two strips of channel irons of different dimensions as 15 and 16, with their flanges facing each other, with binding bolts 17 by which the holding bars may be drawn toward each other, with oppositely placed notches 18 for holding the supporting arms 20 and 21 of my hoe blade 22 formed substantially as described in my Letters Patent No. 1,374,051, with the front and rear edges thin, and the central portion of suitable thickness for maintaining the rigidity of the tool, and normally positioned in approximately the same plane as the frame 6.

The supporting arms are preferably formed of square material with one corner positioned forward for cutting through the earth without scattering the same, and the arms bent upward with a backward curve as 23, and the top ends positioned between the notches 18 and thereby held in such position as the operator may desire to use the blade by tightening the nuts on the binding bolts 17. Additional slots 19 are provided by notches in the holding bars to be used for attaching supporting arms for narrower blades at times, in lieu of that shown.

Attached to and across the frame and in front of the bar 15 is a tooth holding plate 24, with its upper edge 25 and lower edge 26 bent at right angles backward, and holes 27 through the flanges for holding resilient teeth 28 in the desired position, the holes in flange 25 being preferably slightly behind the line of holes in the lower flange, whereby the teeth will be held with their lower and cutting points advanced beyond the upper portion of the teeth on a suitable angle for normally cutting into the surface of the ground in front of the hoe.

In Figure 4 I have shown an enlarged view of one of the teeth, which are preferably formed from stock spring steel wire of suitable size, for working the earth against normal pressure, but when large weeds or other obstructions are gathered in front thereof, the teeth will bend backward as indicated in part by dotted lines 28′ and thus permit the accumulations to slide out behind the same. Above the edge 25 the tooth is bent backward as 29 and provided with a substantially double turn 30, and the free end brought forward to a point above the front of the plate 24, and there bent down to a point adjacent the plate, and again bent at right angles to provide a short holding point 31 which extends through holes in the bar 24, whereby the teeth are held normally with their points at such depth that they will clear the hoe when forced backward as described. But the double turn or coil 30 permits the tooth point to rise perpendicularly when a solid obstruction as a stone, etc., is encountered below, and then the first bent section 29 will rise to the position indicated by dotted line 29′ or higher, and permit the teeth to clear the obstruction beneath.

In use the implement is ordinarily propelled by the operator manually by use of the handles, and is especially valuable in the cultivation of small plants, the teeth stirring the earth near the surface without scattering the same, and the cutting blade following severing all the weed roots and loosening the earth to the level thereof, and the resilient teeth readily freeing themselves of all obstructions, which in turn pass freely above the cutting blade and between the side supporting arms.

The implement is particularly useful for early spring cultivation of rows of young plants. During this season of the year, the ground is frequently too wet to be worked with ordinary tools, but the weeds then grow vigorously, and must be kept down from smothering the plants. I first experimented with my cross cutting blade arranged with a plurality of rake teeth atttached behind the same, but found that the top layer of earth which had been severed by the blade would pass over the same and remain intact like a ribbon, and the rake teeth as soon as they dug into the ribbon would cause the same to roll up into large bunches, and clog the rake and render the same useless, and parts of the roll of accumulated ribbon or earth would work out from each side of the rake and fall on the plants. After numerous experiments with various constructions, I finally invented the construction hereinbefore described, with the resilient teeth projecting forward and in front of the blade, and in that position they first dig and stir the surface of the ground before it has been dislodged by the blade, and the latter then following severs all the weed roots, at a predetermined depth beneath the surface, and the ground is left in fit condition for the plants by the one operation of the implement and the joint functions of the cutter and teeth in front thereof.

Having described my invention, I claim as new for Letters Patent:

1. A cultivating implement, with a frame, and handles adjustably extending rearwardly from the hub of a guide wheel, the wheel revolvably affixed in the forward end of the frame, flanges on the tire of the wheel for holding the same from lateral motion, a midway cross bar on the frame with a plurality of resilient teeth adjustably held in the cross bar and extending beneath the same at an angle to a predetermined point, a rear double cross bar below the frame, a cutting hoe beneath the level of the points of the teeth, arms at each end of the hoe blade bent on a backward curve up from the blade to and between the sections of the rear cross bar, and means for holding the arms in various positions for regulating the position of the blade.

2. A cultivating implement for stirring the surface of the earth and for severing the roots of weeds beneath a predetermined depth, with a frame, a cutting blade disposed beneath the frame and across the line of travel thereof, arms extending up from the blade and adjustably held by the frame, a cross bar on the frame and a plurality of resilient teeth adjustably held by the cross bar with the points of the teeth normally positioned in front of and above the cutting edge of the blade a guide wheel rotatably adjusted at the front of the implement, with flanges on the rim of the wheel and extending outward at right angles therewith, for the reinforcement and rigidity of the rim and for preventing lateral motion of the wheel on the ground.

3. In combination a cultivating implement with a frame, a guide wheel at the front thereof and adjustable handles extending rearwardly, with a bar across the frame and a plurality of resilient teeth adjustably carried by the bar and projecting forward beneath the same, for stirring and agitating the surface of the earth, with a horizontal cutting blade adjustably disposed beneath the frame and laterally to the line of travel and behind the teeth, for cutting beneath the surface of the earth after said surface has been first agitated by the teeth.

4. In combination a cultivating implement, with a frame, a guide wheel at the front end thereof and adjustable handles extending rearwardly for operating the implement, a cutting blade with curved side rods extending up from the ends of the blade to the frame and means for holding the rods and blade at determined positions with the frame for cutting beneath the surface of the earth and for severing the roots of weeds, with a plurality of resilient teeth adjustably carried by a bar attached across the frame in front of the blade, the bars provided with holes through which the teeth may rise to enable their lower points to pass over obstructions, spring loops in the upper portions of the tooth members for normally holding the teeth points on a line slightly above the level of the blade and in front thereof, for agitating the surface of the ground before the same is loosened by the blade.

In testimony whereof I affix my signature.

WILLIAM G. ANDERSON.